United States Patent
Kim

[11] Patent Number: 5,850,269
[45] Date of Patent: Dec. 15, 1998

[54] LIQUID CRYSTAL DISPLAY DEVICE WHERE IN EACH SCANNING ELECTRODE INCLUDES THREE GATE LINES CORRESPONDING SEPARATE PIXELS FOR DISPLAYING THREE DIMENSIONAL IMAGE

[75] Inventor: Jong-man Kim, Suwon, Rep. of Korea

[73] Assignee: Samsung Electronics Co., Ltd., Suwon, Rep. of Korea

[21] Appl. No.: 831,005

[22] Filed: Mar. 31, 1997

[30] Foreign Application Priority Data

Mar. 30, 1996 [KR] Rep. of Korea ............. 1996/9571

[51] Int. Cl.$^6$ .............. G02F 1/1343; G02B 27/22; G02B 27/10; H04N 9/12
[52] U.S. Cl. .............. 349/15; 349/145; 359/463; 359/619; 348/741
[58] Field of Search ............. 349/15, 145; 359/463, 359/619; 348/741, 742

[56] References Cited

U.S. PATENT DOCUMENTS

| | | | |
|---|---|---|---|
| 4,811,003 | 3/1989 | Strathman et al. | 349/146 |
| 5,493,427 | 2/1996 | Nomura et al. | 359/40 |
| 5,535,028 | 7/1996 | Bae et al. | 359/61 |
| 5,548,423 | 8/1996 | Natsunaga | 359/68 |
| 5,602,658 | 2/1997 | Ezra et al. | 349/95 |
| 5,640,273 | 6/1997 | Hamagishi et al. | 359/462 |

FOREIGN PATENT DOCUMENTS

| | | |
|---|---|---|
| 0189214 | 7/1986 | European Pat. Off. .......... 349/115 |
| 0 625 861 | 11/1994 | European Pat. Off. . |
| 0625861a2 | 11/1994 | European Pat. Off. . |
| 0752609A2 | 1/1997 | European Pat. Off. . |
| WO95/22782 | 8/1995 | WIPO . |

Primary Examiner—William L. Sikes
Assistant Examiner—Tarifur R. Chowdhury
Attorney, Agent, or Firm—Foley & Lardner

[57] ABSTRACT

In a liquid crystal display device for displaying a three dimensional image, it is possible to obtain a three dimensional image having appropriate colors corresponding to the colors of objects wherein the data lines are not shown in the picture, the colors of the picture formed in a lens for dividing the left and right images are not formed on the same surface or run counter to one another on the same surface, and the colors are not separately formed by electrically connecting the gate lines corresponding to the color pixels to one another and detouring the source (data) lines so as not to pass through the pixel area and arranging them at the edge thereof. Furthermore, the separate color pixels of red, green and blue of the liquid crystal display panel are arranged in a vertical line, and the separate color pixels of the same color are arranged in the horizontal direction.

7 Claims, 9 Drawing Sheets

LIQUID CRYSTAL DISPLAY DEVICE WHEREIN EACH SCANNING ELECTRODE INCLUDES THREE GATE LINES CORRESPONDING SEPARATE PIXELS FOR DISPLAYING THREE DIMENSIONAL IMAGE

BACKGROUND OF THE INVENTION

The present invention relates to a liquid crystal display device for displaying a three dimensional image, and more particularly, to a liquid crystal display device for displaying a three dimensional image with which a three dimensional image can be seen without using special polarized glasses or shutter glasses.

Generally, the three dimensional image display device with which the three dimensional image can be seen without the use of special polarized glasses or shutter glasses is a device in which the optical images are divided into left and right portions using a special optical system such as a lenticular lens. The structure of such a three dimensional image display device is described as follows with reference to FIG. 1.

Figure 1:
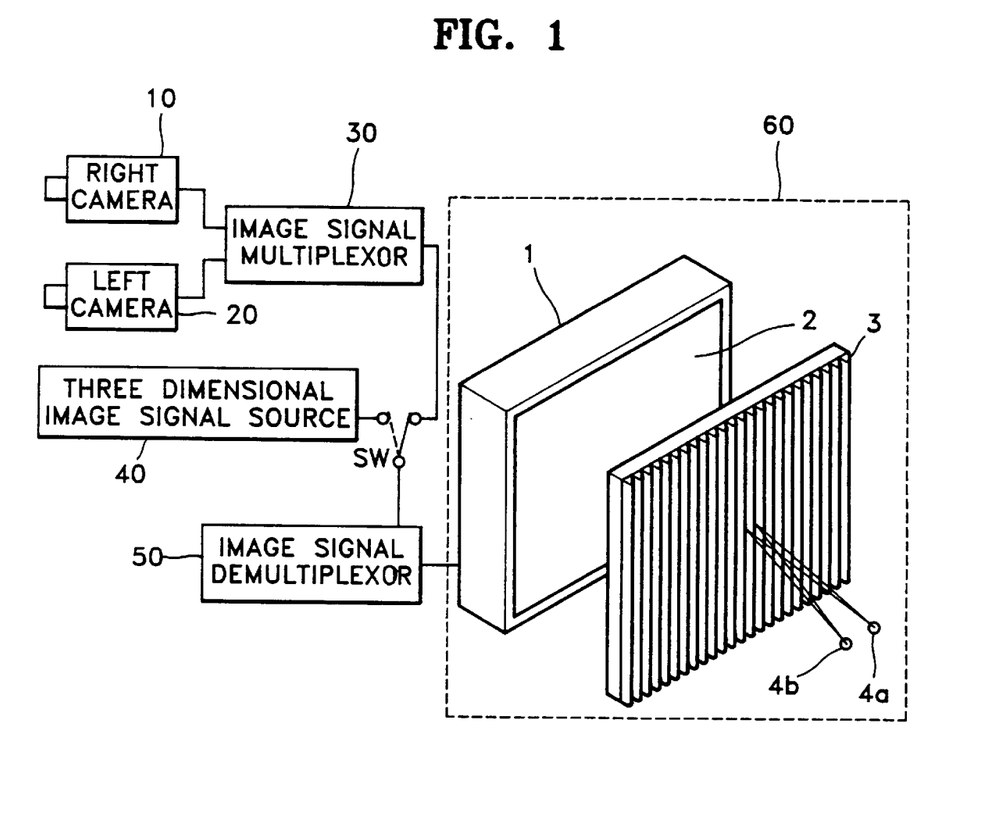
FIG. 1 schematically shows the construction of a general three dimensional image display device.
Figure 2:
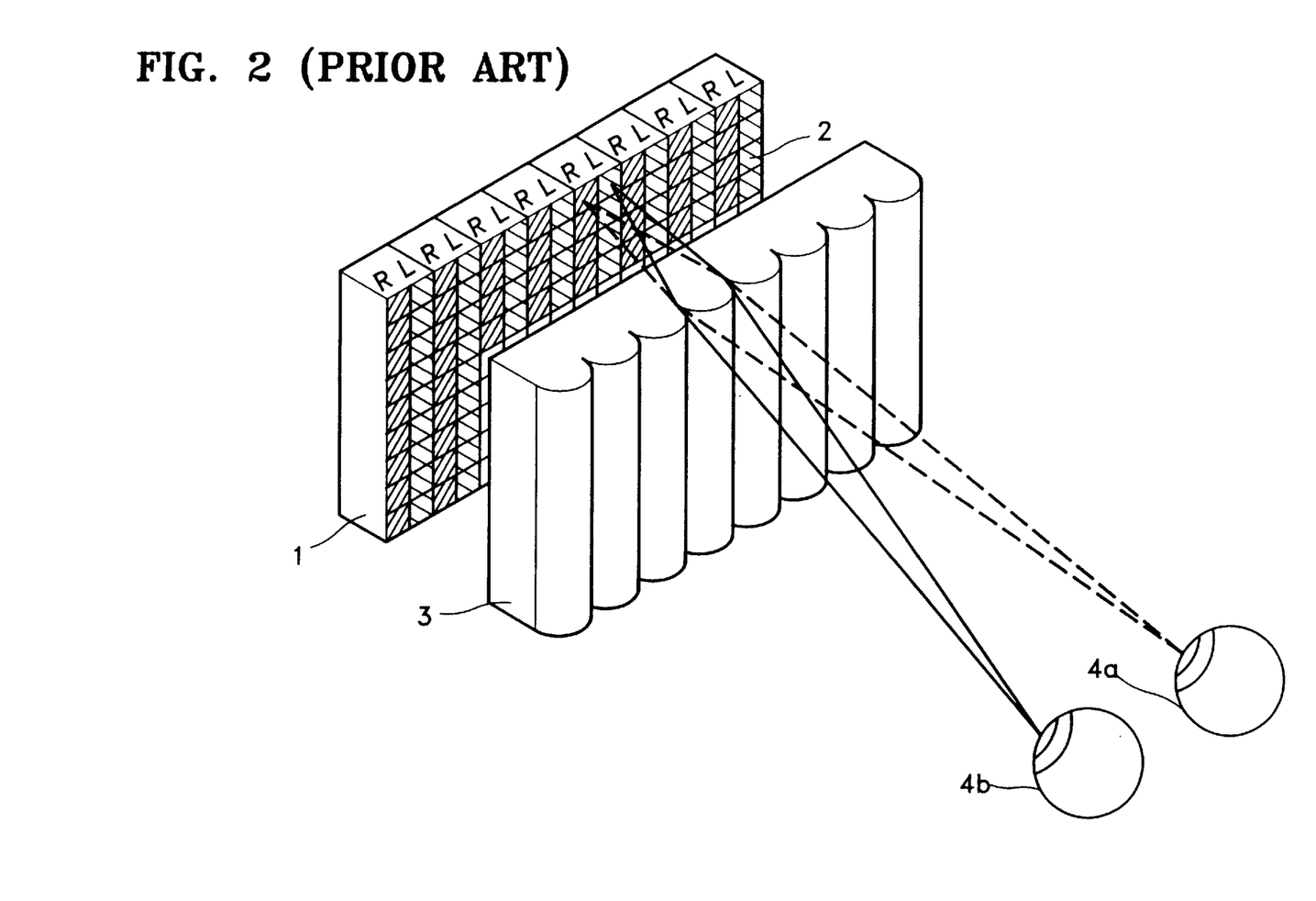
FIG. 2 shows a three dimensional image perceived by an optical system for dividing images of the left and right eyes.

The general three dimensional image display device of FIG. 1 includes right and left cameras 10 and 20, an image signal multiplexor 30, a three dimensional image signal source 40, an image signal demultiplexor 50 and an image display panel 60.

Here, the right and left cameras 10 and 20 respectively form left and right image signals so that the shape of an object can be observed in three dimensions. The multiplexor 30 forms a three dimensional image signal by coupling the right and left image signals generated in the right camera 10 and the left camera 20, respectively. The three dimensional image signal source 40 provides a separate three dimensional image signal such as a three dimensional image signal generated by a software program or a device having the three dimensional image signal stored in a recording medium, which is selectively input as occasion demands through a switch (SW). The image signal demultiplexor 50 separates and processes the three dimensional image signal so that the three dimensional image signal provided from the image signal multiplexor 30 or the three dimensional image signal source 40 can be displayed in the image display panel 60. The image display panel 60 includes an image display panel 1 having a screen 2 such as a CRT, a liquid crystal display (LCD), a plasma display panel (PDP) and an electroluminescence display which independently displays each pixel and an optical system 3 for dividing the left and right images to separately form the three dimensional image taken by the two cameras 10 and 20.

Here, the optical system 3 arranged in front of the screen 2 focuses the left and right image signals L and R in the left and right eyes 4b and 4a of each viewer by a micro-lens group arranged in parallel having an appropriate size according to the size of the pixels. A lenticular lens, a prismatic lens, a light diffuser, and a cylindrical micro-lens are used as the optical system 3.

Figure 3:
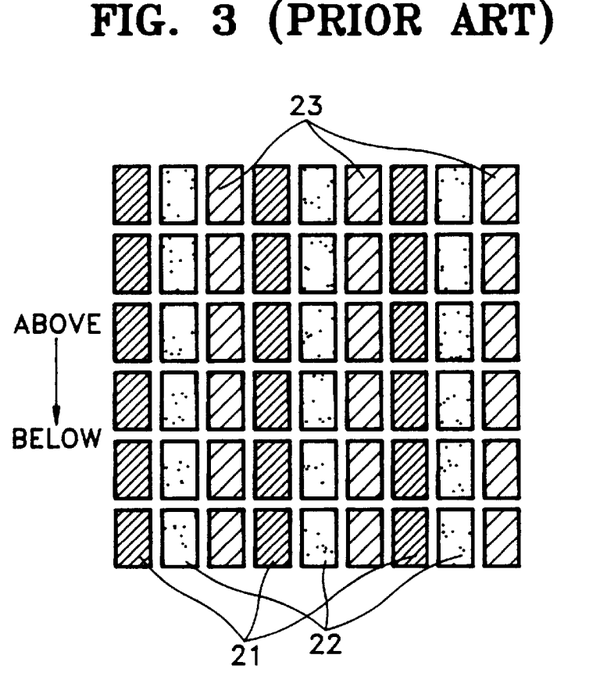
FIG. 3 shows the arrangement of color pixels of a conventional liquid crystal display device.

In the above three dimensional image display device, the left and right image signals correspond to the left and right eyes and the screen 2 of the image display panel 1 is formed of red, green and blue pixels uniformly arranged to form the respective pixels. The pixels can be arranged to form various patterns, however, in almost all image display panels, the three pixels are alternately arranged in the horizontal or vertical direction (not shown) or, as shown in FIG. 3, three separate pixels 21, 22 and 23 corresponding to red, green and blue are alternately arranged as a horizontal line and separate pixels of the same color are arranged as a vertical line. Such an arrangement of color pixels of FIG. 3 is mainly applied to a liquid crystal display device.

Figure 5:
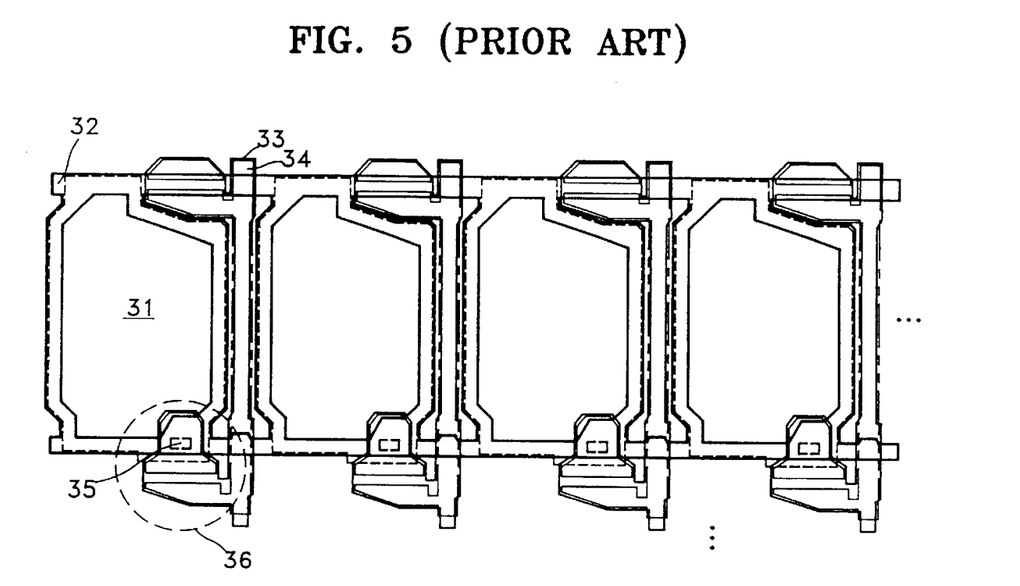
FIG. 5 shows a pixel arrangement in a conventional thin film transistor liquid crystal display device (TFT LCD)

FIG. 5 shows the arrangement of pixels and electrodes of a thin film transistor liquid crystal display device (TFT LCD). In FIG. 5, reference numeral 31, 32, 33, 34, 35 and 36 respectively denote a transparent conductive film, a gate and storage capacitor, an active line, a source (data) line, a contact hole and a thin film transistor (TFT).

Figure 6:
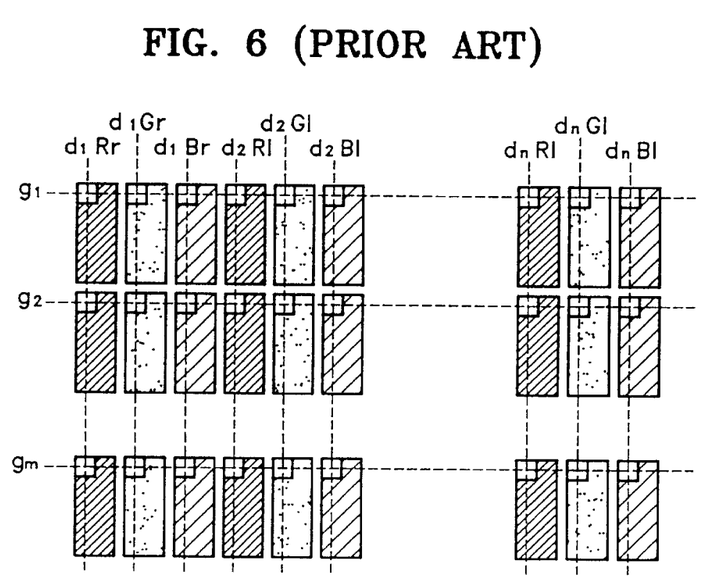
FIG. 6 shows the arrangement of electrodes based on the pixel arrangement shown in FIG. 5.

The arrangement of the pixels and electrodes in such a TFT LCD are described with reference to FIG. 6. In FIG. 6, m gate lines (scanning electrodes; $g_1, g_2, \ldots, g_m$) corresponding to the three separate pixels of red, green and blue are horizontally arranged and n source lines (data electrodes; $d_1Rr, d_1Gr, d_1Br, d_2R1, d_2G1, d_2B1, \ldots, d_nR1, d_nG1, d_nB1$) corresponding to the separate pixels of the same color are vertically arranged.

Figure 4:
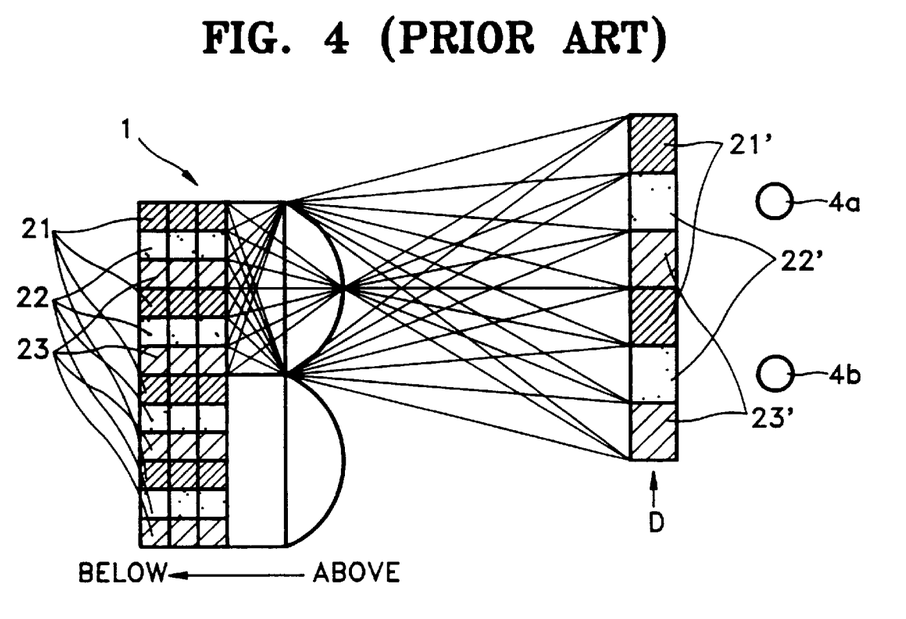
FIG. 4 shows a three dimensional picture perceived by the arrangement of the color pixels of FIG. 3.

In the thin film transistor liquid crystal display device having the color pixel arrangement shown in FIG. 5, the color may be mixed or a variation thereof may be generated since unit lenses of the special optical system to create a temporal difference are vertically formed and horizontally arranged as shown in FIG. 1 and a color breakup phenomenon 21', 22' and 23' in which the respective colors of red, green and blue 21, 22 and 23 are separately seen according to the visual point of an observer as shown in FIG. 4. Therefore, an image display panel having the color pixel arrangement shown in FIG. 3 cannot be used in the three dimensional image display device using a special optical system such as the lenticular lens.

SUMMARY OF THE INVENTION

It is an object of the present invention to provide a liquid crystal display device for displaying a three dimensional image in which red, green and blue colors of separate pixels are not mixed, a variation is not generated, and a color breakup phenomenon in which the respective red, green and blue colors are separately seen according to visual point of an observer does not occur.

To achieve the above object, there is provided a liquid crystal display device for displaying a three dimensional image, comprising right and left cameras respectively generating right and left image signals to enable a viewer to observe objects in three dimensions, image signal processing means for combining the right and left image signals respectively generated in the right and left cameras and making them a three dimensional image signal and for processing the three dimensional image signal by dividing it so as to be displayed as a three dimensional image, a liquid crystal display panel in which the respective pixels are independently controlled by the divided three dimensional image signal to form right and left images, and an optical system disposed in front of the liquid crystal display panel for dividing the right and left images of the liquid crystal display panel, wherein the liquid crystal display panel comprises three separate pixels of red, green and blue which are arranged in a vertical line and the separate pixels of the same color are arranged in a horizontal line, scanning electrode lines in the horizontal direction respectively corresponding to the three separate pixels of red, green and blue, and data electrode lines in the vertical direction respectively corresponding to the three separate pixels of red, green and blue.

In the present invention, the liquid crystal display panel is a thin film transistor liquid crystal display panel having a thin film transistor for driving a liquid crystal in the separate pixels of red, green and blue. Every scanning electrode line includes three gate lines of the thin film transistors which are electrically contacted to one another and the three gate lines are formed to respectively correspond to the separate pixels of red, green and blue. The vertical source lines are alternately arranged three by three in the horizontal direction so as to respectively correspond to the separate vertical pixels of red, green and blue, and the two source lines are arranged at the two edges of the pixels and the source lines arranged in the center are detoured and arranged at either edge of the two edges so as not to overlap with the source lines. The thin film transistors corresponding to the source lines and the respective pixels are arranged at the outside of the respective pixels and are used as the data lines.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

A three dimensional image display device according to the present invention will be described below with reference to the attached drawings.

Figure 7:
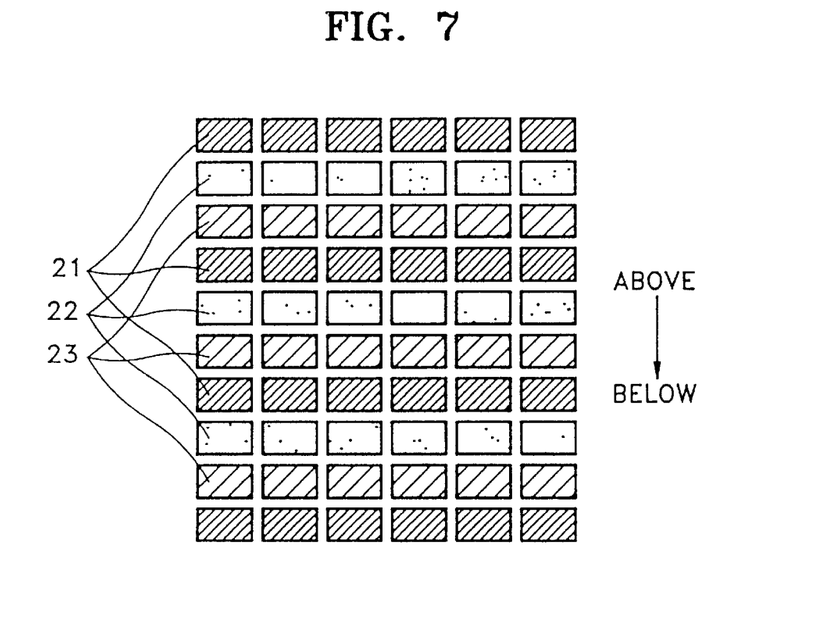
FIG. 7 shows the arrangement of color pixels of the liquid crystal display device for displaying the three dimensional image according to the present invention.

A liquid crystal display device for displaying a three dimensional image according to the present invention basically includes right and left cameras 10 and 20, an image signal multiplexor 30, a three dimensional image signal source 40, an image signal demultiplexor 50 and a liquid crystal display as an image display panel 60 as shown in FIG. 1, whose functions were previously described. Only the arrangement of red, green and blue color pixels forming the screen of a liquid crystal display used as the image display panel 60 is different. The arrangement of the color pixels is described as follows with reference to FIG. 7.

In the liquid crystal display device for displaying the three dimensional image according to the present invention, the three separate pixels of red, green and blue are alternately arranged in a vertical line and the separate pixels of the same color are arranged in a horizontal line to form the screen of the image display panel 60 (Refer to FIG. 1). Color images of the separate pixels do not overlap, a variation is not generated by arranging the red, green and blue color pixels in the vertical direction and, as shown in FIG. 4, a color breakup phenomenon in which the red, green and blue colors are seen separately on a surface D according to the visual point of an observer does not occur. It is possible to obtain a clear three dimensional color picture corresponding to the color of an object since red, green and blue pictures are respectively formed on surfaces A', B' and C' as shown in FIG. 8.

Figure 8:
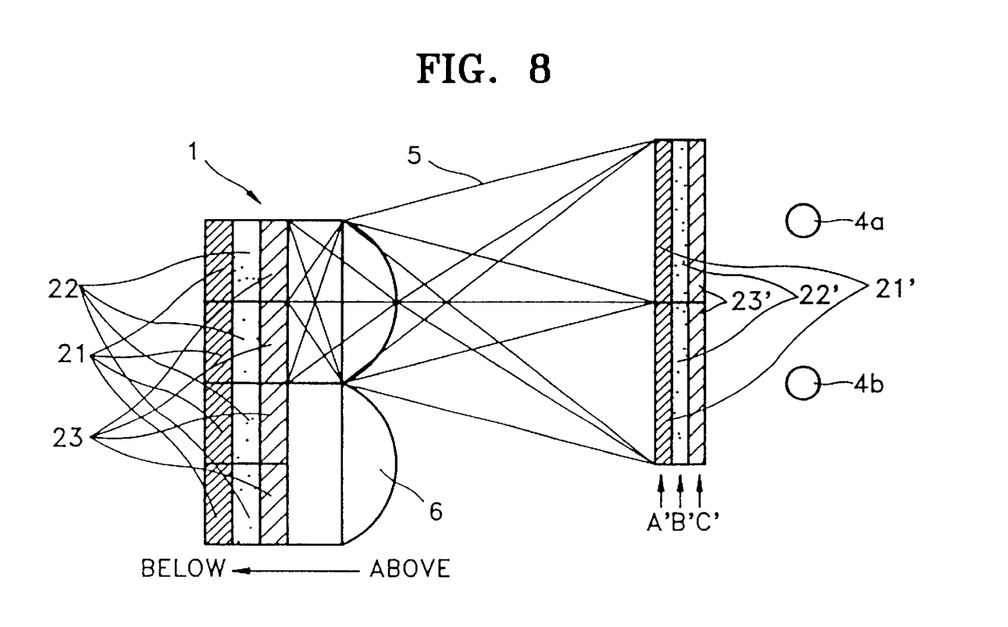
FIG. 8 shows the three dimensional picture perceived by the arrangement of the color pixels of FIG. 7.

In FIG. 8, reference numerals 4a and 4b, 5, 6, 21, 22, 23, 21', 22' and 23' respectively denote the right and left eyes of an observer, a light path, a unit lens of an optical system, a red pixel, a green pixel, a blue pixel, a red picture, a green picture and a blue picture.

Figure 9:
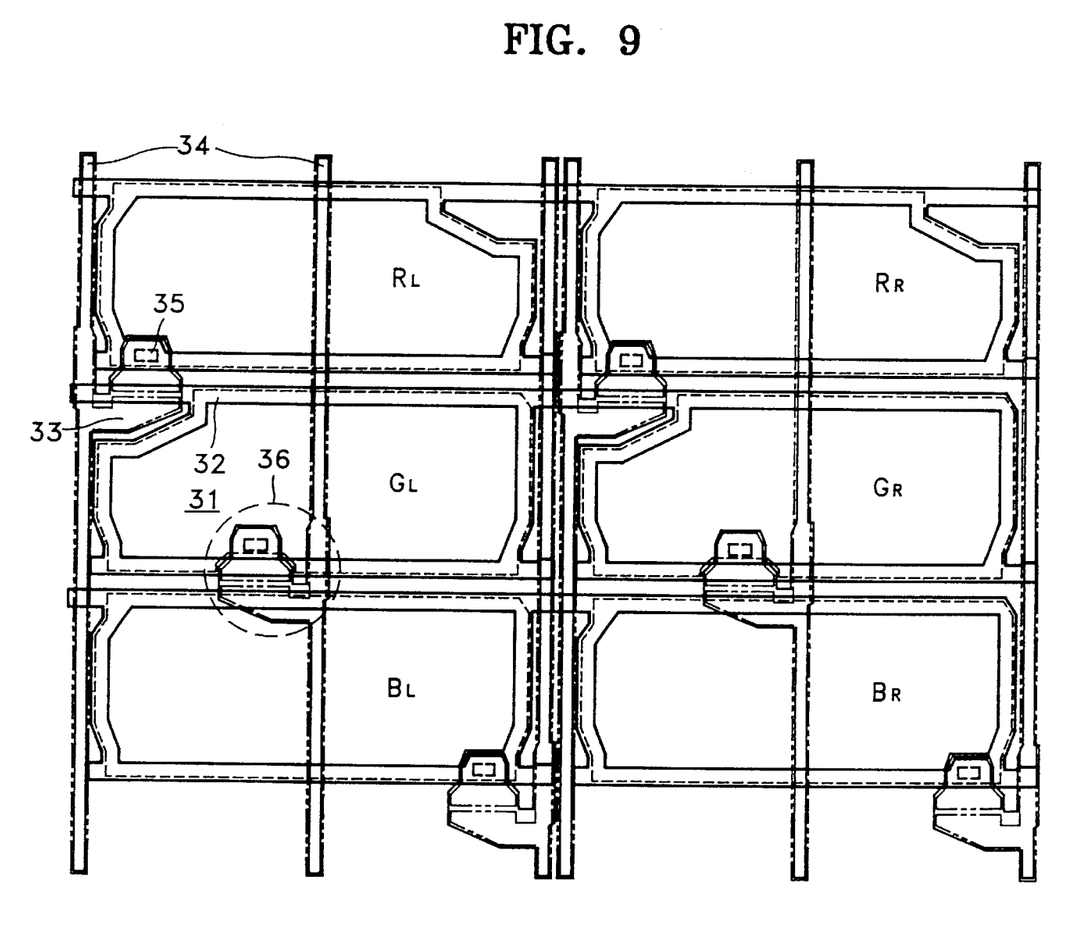
FIG. 9 shows the electrode arrangement of a thin film transistor based on the arrangement of the color pixels of FIG. 7.

The application of such an arrangement of pixels to the TFT LCD is shown in FIG. 9. In the TFT LCD shown in FIG. 9, the separate (color) pixels ($R_L$, $G_L$, $B_L$, $R_R$, $G_R$ and $B_R$) of red, green and blue are alternately arranged in the vertical direction and the separate pixels of the same color are arranged in the horizontal direction. Transparent conductive films 31 are formed in a stripe pattern on the front of a substrate (not shown) on the upper portion of the pixels. A gate and storage capacitor 32 is formed in correspondence to the separate color pixels, thus forming a gate line in the horizontal direction. An active line 33 is a path through which electrons flow and through which a signal, which enters a data line switched by a gate, is transmitted through a drain and reach the pixel electrode. A source (data) line 34 is formed in the vertical direction, in correspondence to the TFT 36 which is included in each separate pixel. Especially, a source line 34 at each pixel (the TFT corresponding to the green pixels) is formed to pass through the center of the color pixels. A contact hole 35 is a contact point in which the signal transmitted from the source is gathered at an active line of the direction of the drain to the pixel electrode through the drain. The TFT 36 is arranged and driven for each color pixel.

The arrangement of electrodes in a liquid crystal display device having such a structure for displaying a three dimensional image will be described below with reference to FIGS. 10 and 11.

Figure 10:
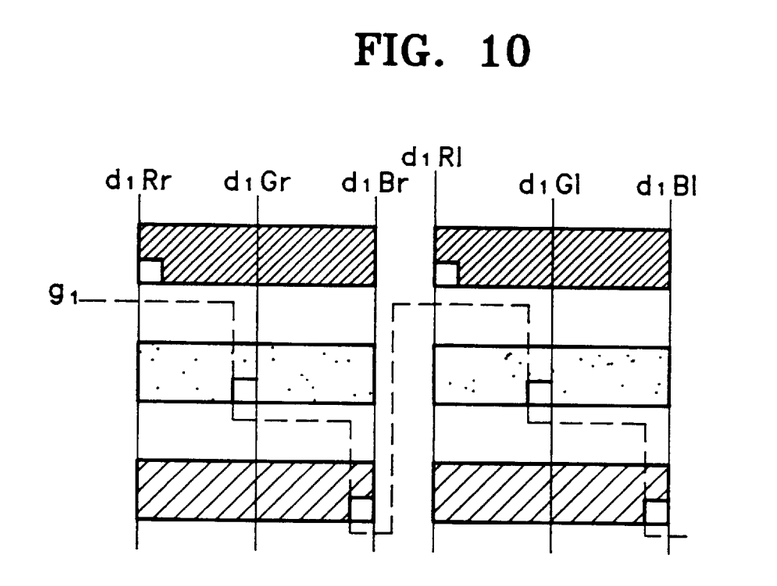
FIGS. 10 and 11 show the arrangement of a gate electrode in the thin film transistor liquid crystal display device based on the arrangement of the color pixels of FIG. 7.

First, as shown in FIG. 10, there is a method in which a gate line $g_1$ which connects the gates of the TFTs arranged in the red, green and blue color pixels is vertically bent, formed into one and then, arranged. Then, as shown in FIG. 11, there is a method in which the gates of the TFTs arranged in each red, green and blue color pixel are respectively connected by three separate gatelines $g_1$ which are electrically contacted to one another. Here, as shown in FIG. 10, the method of arranging a gate line at each pixel has a problem in that the gate line appears in the picture when driving the liquid crystal display device since the gate line passes through the center of the pixel.

Also, in the above two methods, since a source line (for example, the source line of the TFT corresponding to the green pixel) has a line in each color pixel, while passing through the center thereof, as described in FIG. 9, the source lines are shown in the picture during driving of the liquid crystal display. The structure of a display device which eliminates the abovementioned problems is shown in FIG. 12.

Figure 11:
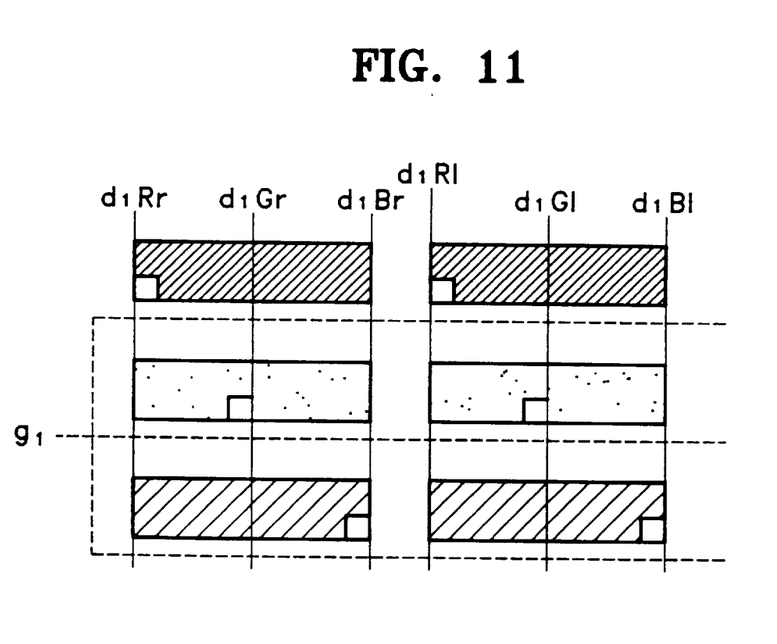
Figure 12:
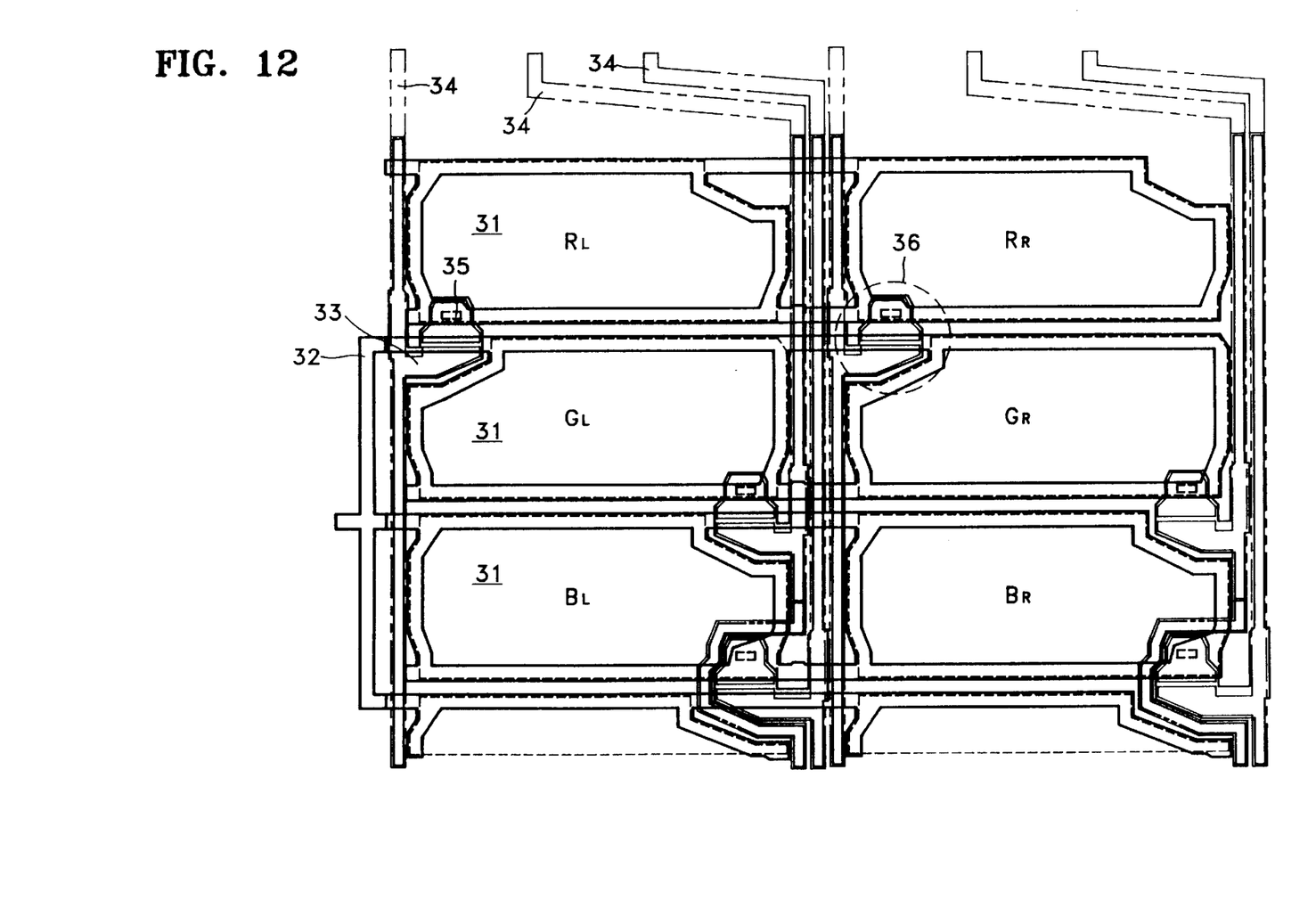
FIG. 12 shows the electrode arrangement of a thin film transistor liquid crystal display device for displaying the three dimensional image according to the present invention.

In the thin film transistor liquid crystal display device for displaying the three dimensional image, a horizontal gate line 32 is formed by preparing three horizontal lines at each color pixel and connecting them to one another as shown in FIG. 11 and a vertical source line (data line) 34 is formed by detouring the source line to an edge of the pixel as shown in FIG. 12. A detailed description thereof will now be given with reference to FIG. 13.

Figure 13:
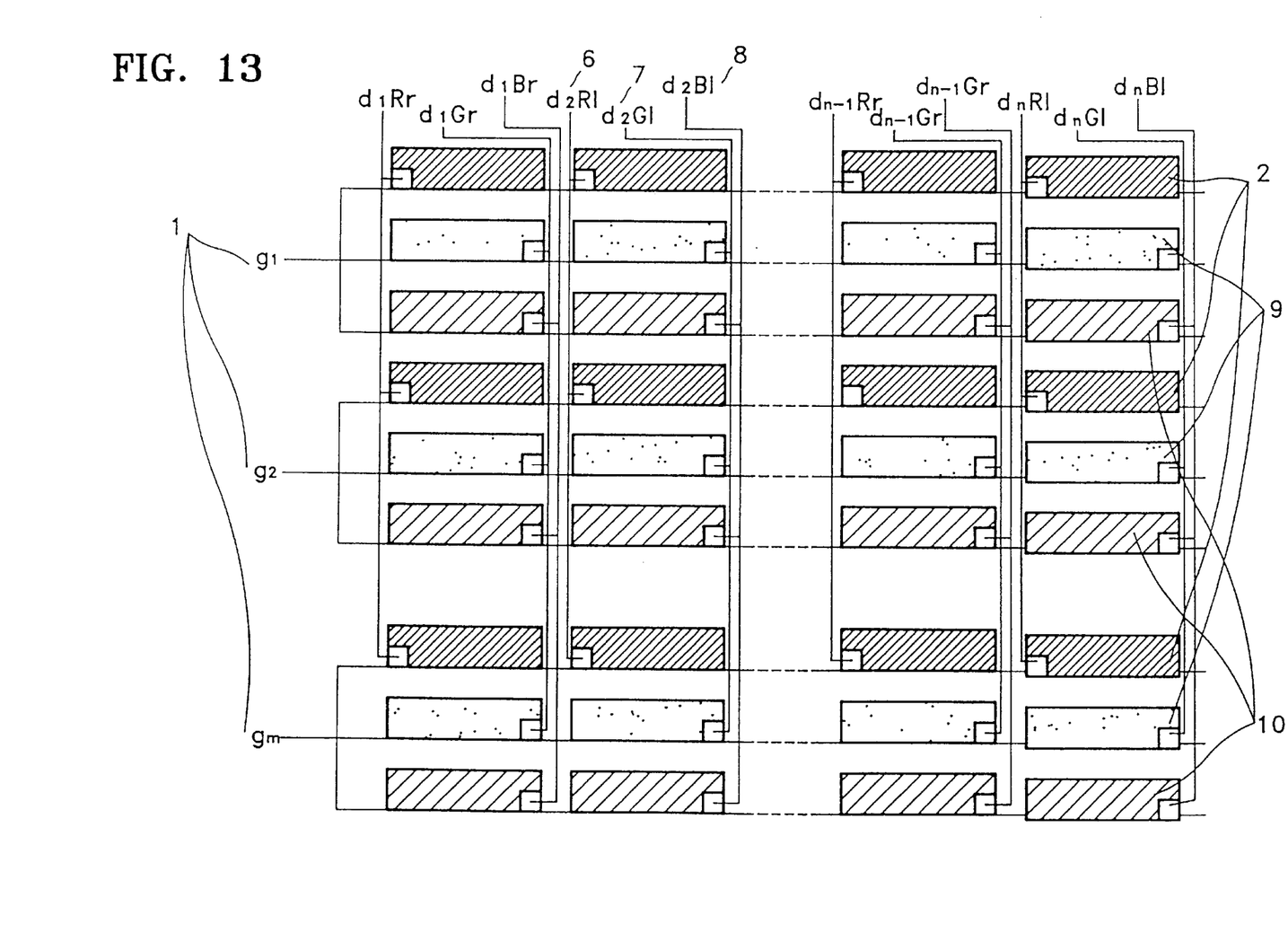
FIG. 13 shows the arrangement of gate and source electrodes in the thin film transistor liquid crystal display device for displaying the three dimensional image shown in FIG. 12.

In the thin film transistor liquid crystal display device for displaying the three dimensional image, the color pixels of red, green and blue are arranged in the vertical direction and the like-color pixels are arranged in a line in the horizontal direction. The respective three gate lines corresponding to the red, green and blue color pixels are prepared and, as shown in FIG. 13, the horizontal gate lines of the respective pixels are electrically connected to form gate lines ($g_1$, $g_2$, ..., $g_m$) 1 corresponding to the respective color pixels. Therefore, the number of gate lines increases by three times. Also, the source lines (data electrodes; $d_1Rr$, $d_1Gr$, $d_1Br$, $d_2R1$, $d_2G1$, $d_2B1$, ..., $d_nR1$, $d_nG1$, $d_nB1$) 6, 7 and 8 corresponding to the color pixels of red, green and blue of the respective pairs of pixels corresponding to the right and left image signals detour the pixel areas 2, 9 and 10 and are prepared at the edges thereof, as shown in FIG. 13. Therefore, the TFTs for driving the liquid crystal display device having the sources connected to the source lines are arranged at the edges of the respective color pixels. Actually, the source lines come to have the same lines as those of a conventional TFT LCD.

The TFT LCD for displaying the three dimensional image according to the present invention has an advantage in that a conventional driving IC can be used since it has the same pixel size as that of the conventional TFT LCD and can be manufactured by modifying some of the positions of the TFTs corresponding to the pixels and the gate lines and re-arranging a color filter. An opening ratio is reduced from 60% in the conventional TFT-LCD to 50% due to the detour of the data (source) line as shown in FIG. 12. Also, there is a small loss of brightness since almost all the light displayed by the lenticular optical system is focused on the eyes of the observer.

In the liquid crystal display device for displaying the three dimensional image according to the present invention, the separate color pixels of red, green and blue of the liquid crystal display panel are arranged in a vertical line and the separate color pixels of the same color are arranged in the horizontal direction. Also, the colors of the picture are not formed on the same surface or run counter to one another on the same surface, and the colors are not separately formed by electrically connecting the gate lines corresponding to the color pixels to one another and detouring the source (data) lines so as not to pass through the pixel area, instead arranging them at the edge thereof. Thus, it is possible to obtain a three dimensional image having appropriate colors corresponding to the colors of the subjects to be viewed wherein the data lines are not shown in the picture.

What is claimed is:

1. A liquid crystal display device for displaying a three dimensional image, comprising:
   right and left cameras respectively generating right and left image signals to enable a viewer to observe objects in three dimensions;
   image signal processing means for combining the right and left image signals respectively generated in said right and left cameras and making them a three dimensional image signal and for processing the three dimensional image signal by dividing it so as to be displayed as a three dimensional image;
   a liquid crystal display panel in which the respective pixels are independently controlled by said divided three dimensional image signal to form right and left images; and
   an optical system disposed in front of said liquid crystal display panel, for dividing the right and left images of said liquid crystal display panel,
   wherein said liquid crystal display panel comprises:
      three separate pixels of red, green and blue which are arranged in a vertical line and the separate pixels of the same color are arranged in a horizontal line;
      scanning electrode lines in the horizontal direction respectively corresponding to said three separate pixels of red, green and blue; and
      data electrode lines in the vertical direction respectively corresponding to said three separate pixels of red, green and blue,
      wherein said liquid crystal display panel is a thin film transistor liquid crystal display panel having a thin film transistor for driving the liquid crystal in each of said separate pixels of red, green and blue, and
      wherein each scanning electrode line includes three gate lines of said thin film transistors which are electrically contacted to one another and the three gate lines are formed to respectively correspond to said separate pixels of red, green and blue.

2. A liquid crystal display device for displaying a three dimensional image as claimed in claim 1, wherein the horizontal scanning electrode lines are electrically connected three by three to respectively correspond to said separate pixels of red, green and blue in the vertical direction so as to be driven at the same time.

3. A liquid crystal display device for displaying a three dimensional image as claimed in claim 1, wherein said vertical data lines are formed so that the data lines of said thin film transistor liquid crystal display panel respectively correspond to said pixels of the vertical direction.

4. A liquid crystal display device for displaying a three dimensional image as claimed in claim 3, wherein said vertical data lines are alternately arranged three by three in the horizontal direction so as to respectively correspond to the separate vertical pixels of red, green and blue, and two data lines arranged at the two edges of the respective pixels and a third data line arranged in the center are detoured and arranged at either edge of the two edges so as not to overlap with said data lines.

5. A liquid crystal display device for displaying a three dimensional image as claimed in claim 4, wherein the thin film transistors corresponding to said data lines and said respective pixels are arranged at the outside of said respective pixels.

6. A liquid crystal display device for displaying a three dimensional image as claimed in claim 1, wherein said optical system for dividing left and right images is formed of a lens selected from the group consisting of a lenticular lens, prism pattern lens, an optical diffusion lens and a micro lens.

7. A liquid crystal display device for displaying a three dimensional image, comprising:
   right and left cameras respectively generating right and left image signals to enable a viewer to observe objects in three dimensions;

image signal processing means for combining the right and left image signals respectively generated in said right and left cameras and making them a three dimensional image signal and for processing the three dimensional image signal by dividing it so as to be displayed as a three dimensional image;

a liquid crystal display panel in which the respective pixels are independently controlled by said divided three dimensional image signal to form right and left images; and an optical system disposed in front of said liquid crystal display panel, for dividing the right and left images of said liquid crystal display panel, wherein said liquid crystal display panel comprises:
three separate pixels of red, green and blue which are arranged in a vertical line and the separate pixels of the same color are arranged in a horizontal line;

scanning electrode lines in the horizontal direction respectively corresponding to said three separate pixels of red, green and blue; and data electrode lines in the vertical direction respectively corresponding to said three separate pixels of red, green and blue, wherein said liquid crystal display panel is a thin film transistor liquid crystal display panel having a thin film transistor for driving the liquid crystal in each of said separate pixels of red, green and blue, and wherein each pixel includes a gate line of said thin film transistors and each gate line is vertically bent and formed to respectively correspond to said separate pixels of red, green and blue.

* * * * *